United States Patent [19]

Neuman et al.

[11] Patent Number: 5,006,092
[45] Date of Patent: Apr. 9, 1991

[54] CONTINUOUSLY VARIABLE TRANSMISSION POWER TRAIN CONFIGURATION

[75] Inventors: Guenter Neuman; William J. Haley, both of Ithaca, N.Y.

[73] Assignee: Borg-Warner Automotive, Inc., Sterling Heights, Mich.

[21] Appl. No.: 529,010

[22] Filed: May 24, 1990

[51] Int. Cl.5 ............................................. F16H 63/00
[52] U.S. Cl. ......................................... 474/8; 474/11; 474/17
[58] Field of Search .................. 474/8, 11, 29, 12, 17, 474/30, 18, 69, 70, 25, 27; 74/865, 866, 867

[56] References Cited

U.S. PATENT DOCUMENTS

| | | | |
|---|---|---|---|
| 4,433,594 | 2/1984 | Smirl | 474/12 X |
| 4,541,821 | 9/1985 | Sakakibara | 474/11 X |
| 4,904,229 | 2/1990 | Hattori | 474/12 |

Primary Examiner—Thuy M. Bui
Attorney, Agent, or Firm—Neuman, Williams et al.

[57] ABSTRACT

A power train configuration for a continuously variable transmission includes a slippable start clutch located upstream of a belt and sheave system and a pair of non-dynamic forward-reverse clutches located down stream of the continuously variable component. The clutch capacities of the pair of forward-reverse clutches are marginally greater than the maximum torque capacity of the engine but marginally less than the torque at which the belt of the belt and sheave system slips.

10 Claims, 2 Drawing Sheets

CONTINUOUSLY VARIABLE TRANSMISSION POWER TRAIN CONFIGURATION

BACKGROUND OF THE INVENTION

1. Field of the Invention

This invention relates to continuously variable transmissions (CVTs) in which the belt connecting the sheave system of the CVT is protected against slippage caused by an excessive torque. More particularly, this invention relates to the location of a non-dynamic clutch downstream of the belt and sheave that is configured for slippage at high torques, prior to the slippage of the belt.

2. Description of the Prior Art

A continuously variable transmission system utilizes a pair of adjustable pulleys, including a primary pulley and a secondary pulley. Each pulley has at least one sheave that is axially fixed and another sheave that is axially movable relative to the first. A flexible belt of metal or elastomeric material interconnects the pulleys. The inner faces of the sheaves of the pulley are bevelled or chamfered so that as the axially displaceable sheave moves relative to the fixed sheave, the distance between the sheaves and, thus, the effective pulley diameter may be adjusted. The primary pulley is driven by an engine and the output of the secondary pulley drives the drive train of the vehicle. The drive train is typically connected to the secondary pulley through a clutch. U.S. Pat. No. 4,433,594, entitled "Variable Pulley Transmission", provides further information regarding CVTs and is incorporated herein in terms of background to the present invention.

The displaceable sheave of each pulley includes a fluid constraining chamber for receiving fluid to move the sheave and thus change the effective pulley diameter. Increasing the fluid in the chamber increases the effective diameter of the pulley. As fluid is exhausted from the chamber, the pulley diameter is decreased. Generally, the effective diameter of the primary pulley is moved in one direction as the effective diameter of the secondary pulley is moved in the other.

The movement of the sheave of the primary pulley servo regulates the transmission ratio across the CVT. The hydraulic pressure of the sheave of the secondary pulley servo varies the clamping force on the belt connecting the primary and secondary pulleys. It is important to control the clamping force on the belt connecting the two pulleys to prevent damage that might result from belt slippage. Slip will occur if the sheave clamping force is inadequate to transmit the torque supplied by the engine across the continuously variable transmission. This slippage is the occurrence with which this invention is primarily concerned.

A torque spike is likely to occur whenever the vehicle drive wheels slip and then reengage. When the drive wheels slip, the transmission output shaft continues its rotation in the direction in which it is being driven by the engine. However, when the drive wheels stop slipping and are reengaged, there is resistance to the rotation of the drive shaft and a torque spike is suddenly experienced by the CVT. This sudden torque spike will overload the belt connecting the primary and secondary pulleys and cause the belt to slip. Such slippage occurs on account of the belt clamping force being only marginally above that required to prevent slippage for normal driving conditions.

There are several situations in which a torque spike might cause belt slippage. One such situation is when a car skids on an icy patch of road. As the car skids, the wheels rotate freely. When the skid is corrected, the wheels grip the road surface and a momentary reaction torque is experienced. A similar sequence of events occurs when the drive wheels of a vehicle momentarily disengage from the ground, as for example, when passing over a pot hole. Serious damage can occur to the belt and sheaves of a CVT if no precautions are taken and the momentary reaction torque causes the belt of the belt and sheave system to slip.

One approach to the prevention of damage caused by a torque spike can be found in U.S. Pat. No. 4,433,594, mentioned previously. In this system, a slippable start clutch is positioned downstream of the belt and sheave system. The start clutch is arranged to slip when the torque experienced by the clutch is above a critical value. The use of a slippable clutch with a variable clutch capacity requires a control system to ensure that the torque at which the clutch slips is at all times compatible with system requirements. The continuously variable transmission system of the present invention provides a rather more compact arrangement for a continuously variable transmission system utilizing economy of space.

OBJECTS OF THE INVENTION

Accordingly, it is an object of this invention to provide an improved continuously variable transmission that meets the aforementioned needs.

It is a specific object of this invention to provide a compact arrangement for a power train that protects against slippage of the belt due to torque spikes.

It is another object of this invention to provide a non-dynamic clutch system to protect against belt slippage due to torque spikes in a continuously variable transmission.

Other objects, advantages and features of this invention will become apparent on reading the following description and appended claims, and upon reference to the accompanying drawings.

SUMMARY OF THE INVENTION

In accordance with one embodiment of this invention, a compact arrangement for a power train having a continuously variable transmission which achieves the foregoing objects includes a first variable pulley disposed on a first shaft, a second variable pulley disposed on a second shaft and a belt connecting the first and the second pulleys. The belt system is arranged to transmit torque up to a predetermined limit greater than the torque transmission capacity of the engine. A slippable start clutch is positioned upstream of the first pulley. A non-dynamic clutch system, comprising one or two non-dynamic clutches, is connected to the second shaft downstream of the second variable pulley. The non-dynamic clutch system has a predetermined clutch capacity set at a level exceeding the torque capacity of the engine driving the power train, but less than the torque capacity of the belt system.

The non-dynamic clutch system has two conditions, a first or locked condition and a second or unlocked condition. The clutch system is mechanically actuated between the first and second conditions. In response to torque in excess of the predetermined clutch capacity, the clutch system slips. The predetermined clutch capacity of the non-dynamic clutch system is set at a level less than the torque at which the belt connecting the first and second pulleys slip. The non-dynamic clutch capacity can have any value provided the capacity is sufficient to transmit the maximum torque of the engine and is not greater than the torque at which the belt between the first and second pulleys will slip.

Preferably, two non-dynamic clutches are located downstream of the second pulley and are used to provide the forward-reverse mechanism of the transmission.

BRIEF DESCRIPTION OF THE DRAWINGS

For a more complete understanding of this invention, reference should now be made to the embodiment illustrated in greater detail in the accompanying drawings and described by way of example only. In the drawings.

DETAILED DESCRIPTION OF THE DRAWINGS

Figure 1:
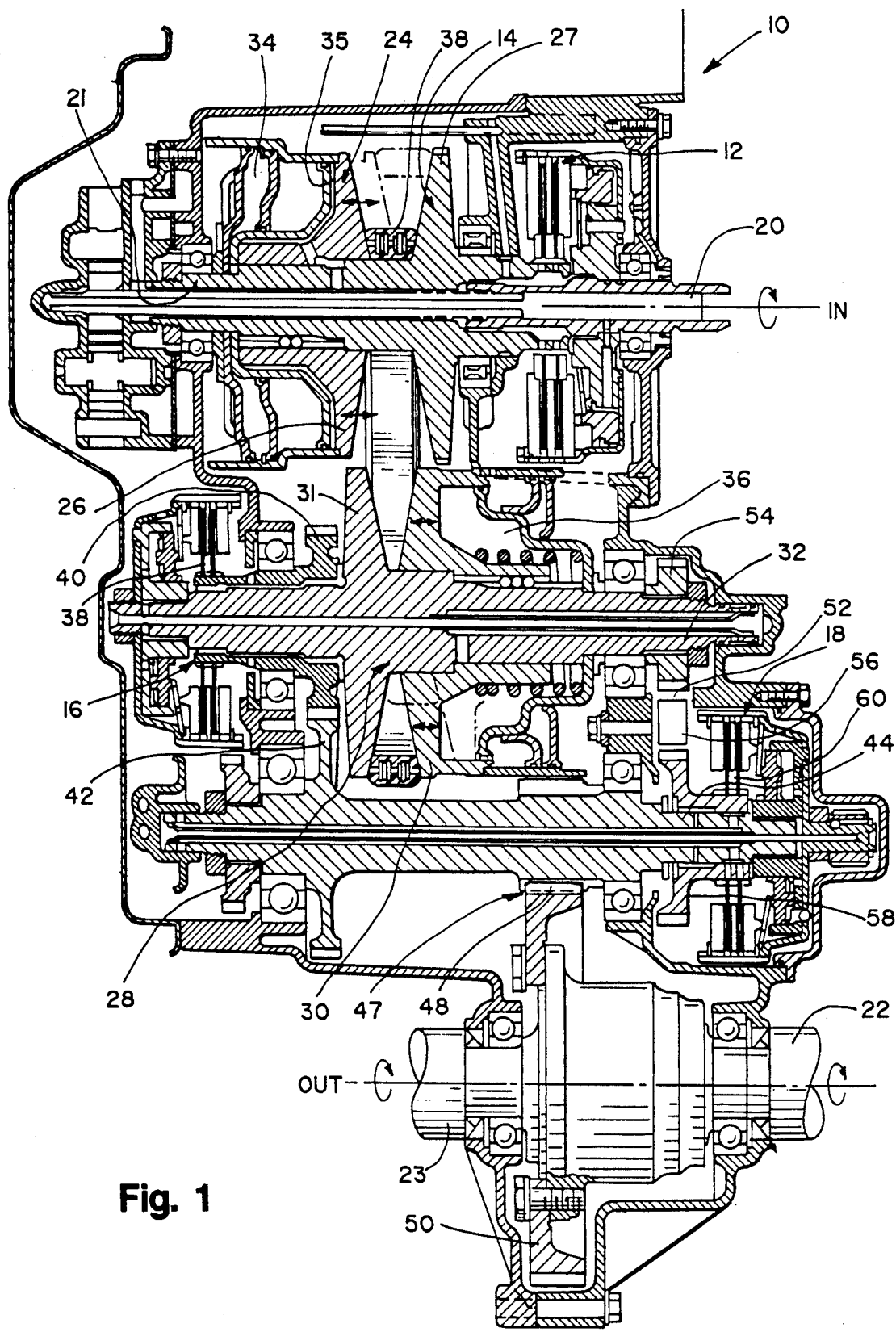
FIG. 1 is a sectional view of the continuously variable transmission system of this invention.
Figure 2:
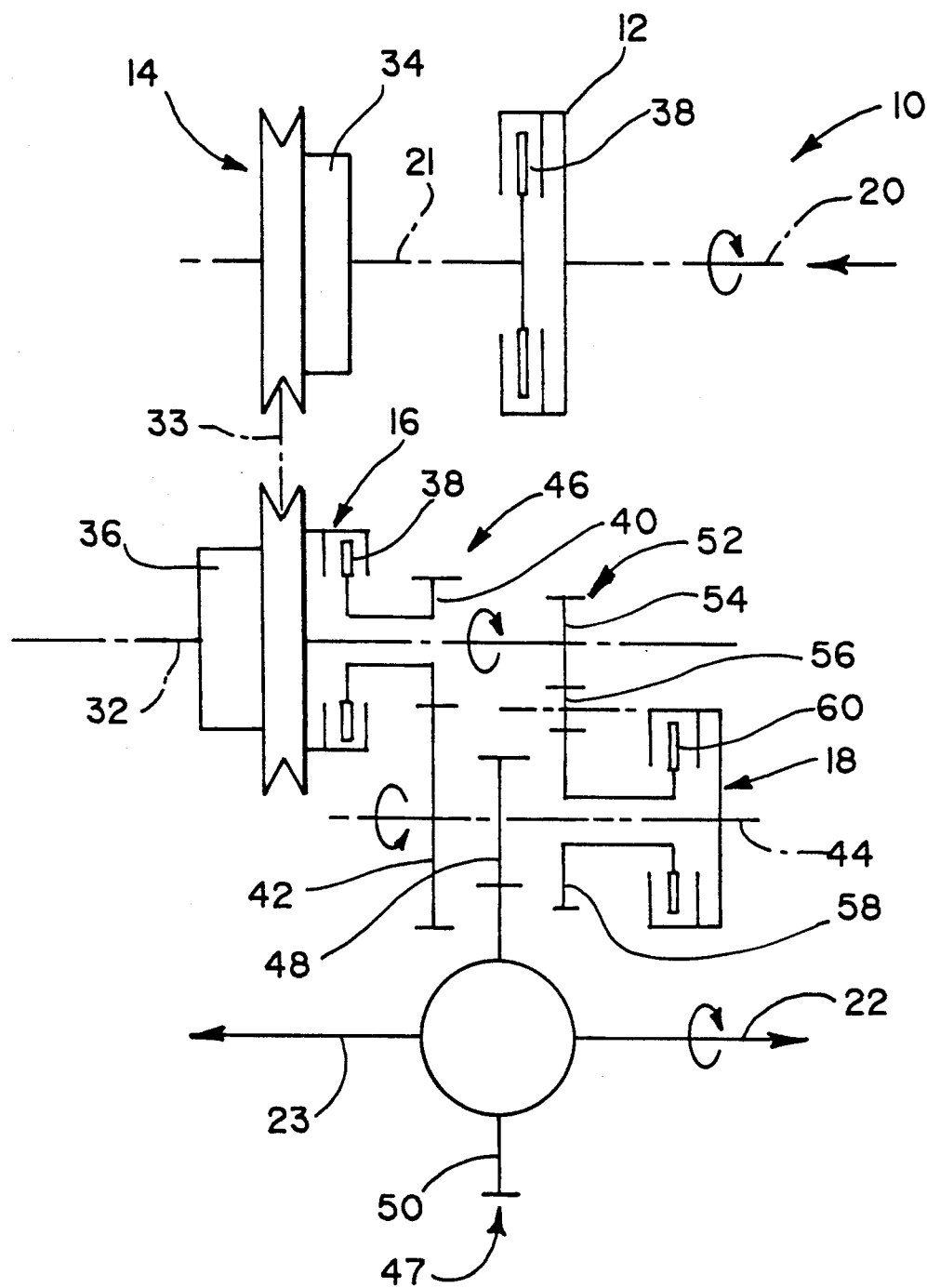
FIG. 2 is a schematic representation of the continuously transmission system of this invention.

Turning to FIGS. 1 and 2, a compact arrangement for a continuously variable transmission (CVT) generally designated 10 is shown. FIG. 2 is a schematic representation illustrating the general features of the transmission system of FIG. 1. While FIG. 1 gives a more detailed depiction of the transmission system, the operation of the system can be more fully understood by reference to the U.S. Pat. No. 4,433,594 referred to above and incorporated herein by reference. A slippable start clutch 12 is located upstream of a belt and sheave system, shown generally as 14, and non-dynamic forward and reverse clutches 16, 18 are situated downstream of the belt and sheave system 14. The belt and sheave system 14, which is described more fully below, includes first and second variable pulleys and an endless belt connecting the pulleys. The non-dynamic clutches 16, 18 have predetermined clutch capacities to allow them to act as fuses to prevent the transmission of a torque spike to the belt and sheave system 14.

The continuously variable transmission includes a pair of input shafts 20, 21 for the input of the torque from the engine to the transmission, and a pair of output shafts 22, 23 for the output of torque from the transmission to the vehicle drive wheels. A first variable pulley 24 having a first movable sheave 26 and a first fixed sheave 27 is disposed on the shaft 21. A second variable pulley 28 having a second movable sheave 30 and a second fixed sheave 31 is disposed on a first intermediate shaft 32. The first and second pulleys 24 and 28 are coupled by an endless belt 33. The flexible belt can be of metal or elastomeric construction, as known in the art. A first servo chambers 34, 35 receive fluid to force movement of the first movable sheave 26 and a second servo chamber 36 receives fluid to force movement of the second movable sheave 30.

The start clutch 12 is located on the input shaft 20. The start clutch acts to transmit torque from shaft 20 to shaft 21. The start clutch 12 is a slippable clutch that is fluid actuated. The pressure of fluid applied to the start clutch 12 controls the amount by which the start clutch 12 slips. A controlled minimum clutch slippage during operation can be used to reduce the transmission of torsional vibrations from the engine (not shown) to the pulley system of the CVT. The start clutch can also be a torque converter or other fluid coupling means (not shown).

The operation of the continuously variable transmission 10 is controlled by the pressure of fluid supplied to the first and second servo chambers 34, 35, 36. The pressure in the first servo chambers 34, 35 moves the first movable sheave 26 to regulate the ratio between the shaft 21 and first intermediate shaft 32. The pressure supplied to the second servo chamber 36 moves the second movable sheave 30 to regulate the clamping force on the belt 33 to prevent belt slippage.

Downstream of the belt and sheave system 14, the non-dynamic, forward clutch 16 is disposed on the first intermediate shaft 32 and the non-dynamic, reverse clutch 18 is disposed on a second intermediate shaft 44. The forward and the reverse clutches are non-dynamic and therefore operate in one of two conditions, a first, or locked, condition or a second, or unlocked, condition. The forward and reverse clutches are hydraulically actuated between the first and second conditions in response to the position of a gear lever (not shown). Engagement of the forward clutch 16 causes, through a series of gear members, the transmission output shafts 22, 23 to rotate in a first direction for forward movement of the vehicle. Engagement of the reverse clutch 18 causes, through a series of gear members, the transmission output shafts 22, 23 to rotate in a second direction opposite to the first direction for reverse movement of the vehicle. The forward and the reverse clutches 16, 18 are not engaged at the same time, as this results in the system being locked preventing rotation of the output shafts 22, 23 in either direction. Both clutches are released when the transmission is in the neutral or park condition.

A forward gearing system 46 is coupled for rotation with the movable clutch plate 38 of the forward clutch 16. The system 46 is driven by the CVT when the forward clutch 16 is engaged to couple the first intermediate shaft 32 to the second intermediate shaft 44. When the forward clutch 16 is released, no torque is transmitted to the second intermediate shaft 44. The forward gearing system 46 includes a drive gear 40 connected to the clutch plate 38 and a driven gear 42 disposed for rotation with the second intermediate shaft 44.

The second intermediate shaft 44 is coupled to the transmission output shafts 22, 23 through an output gear system 47 that includes a drive gear 48 and a driven gear 50. With the output gear system 47 as illustrated, the transmission output shafts 22, 23 rotate in the same direction as the first intermediate shaft 32 to drive the vehicle in the forward direction when the forward clutch 16 is engaged. The gearing system could, however, take an alternative arrangement and cause the output shafts 22, 23 to rotate in the opposite direction of the second intermediate shaft 44 provided of course that the output shafts 22, 23 rotates in the forward direction for forward motion and the reverse direction for reverse motion.

A reverse gearing system 52 couples the second intermediate shaft 44 to the movable clutch plate 60 of the reverse clutch 18. When the reverse clutch 18 is engaged, the reverse gearing system 52 drives the second intermediate shaft 44. The reverse gearing system 52 includes a drive gear 54, an idler gear 56, and a driven gear 58 so that the second intermediate shaft 44 rotates in the opposite direction when the reverse clutch 18 is engaged to that in which it rotates when the forward clutch 16 is engaged. The drive gear 54 is disposed on the first intermediate shaft 32 and rotates with the first intermediate shaft 32 at all times. The idler gear is located on an offset shaft (not shown). When the reverse clutch 18 is released, the clutch plate 60 and driven gear 58 rotate freely on the second intermediate shaft 44 and there is no transfer of torque to the second intermediate shaft 44 through the reverse gearing system 52. When the reverse clutch 18 is engaged and the forward clutch 16 released, the second intermediate shaft 44 rotates in the second direction. The second intermediate shaft 44 in turn drives the output shafts 22, 23 through the output gear system 47 to move the vehicle in the reverse direction.

It is important to the operation of this system that, in addition to changing condition in response to the position of a gear lever, non-dynamic forward and reverse clutches 16, 18 slip when the torque to be transmitted is in excess of the clutch capacity. The clutch capacities of the forward and reverse clutches 16, 18 are therefore predetermined to be greater than the maximum torque transmitted to the drive train in order that slippage does not occur during ordinary operation of the engine.

The capacities of the forward and reverse clutches 16, 18 must be set at a proper level to achieve all the benefits of this invention. The clutches act as fuses when excessive torques are experienced and the clutch capacity must not therefore be great enough to allow these excessive torques to be transmitted to the belt and sheave system 14 without slipping of the engaged clutch, that is, either the forward clutch 16 or the reverse clutch 18. The clutch capacity of the forward and reverse clutches 16, 18 are set to be marginally greater than the torque transmitted by the engine and marginally less than the torque at which the belt of the continuously variable component slips. For example, in an engine that transmits a maximum torque of 100 ft. lbs., the belt may for safety be set to slip at torques around 130 ft. lbs. while the forward clutch may be set to slip at torques of 110 ft. lbs. Any condition that creates a torque in excess of 110 ft. lbs. will cause the forward clutch to slip in preference to the belt so that the belt and sheave system 14 is not damaged.

The clutch capacity of the reverse clutch 18 is set using the same criteria as those used in setting the torque capacity of the forward clutch 16 so that the capacity of the reverse clutch 18 falls between the maximum torque to be transmitted by the engine and the torque at which belt slippage occurs. Although possible figures for the engine torque, belt slip and clutch capacities have been given, the apparatus will function in accordance with this invention if the clutch capacities of the forward and reverse clutches have values that fall within the limits defined by the maximum engine torque and the torque at which belt slip occurs.

By positioning the forward reverse-mechanism of the continuously variable transmission downstream of the belt and sheave system and the start clutch upstream, a compact arrangement for the transmission is achieved. The use of a pair of non-dynamic clutches acting as fuses provides protection for the belt and sheave system against excessive torque without a requirement for a complex control system and without necessitating excess pressure in the hydraulic system. This allows the control system of this invention to operate the transmission system in an efficient manner.

The arrangement of this invention provides a compact and efficient continuously variable transmission. The non-dynamic clutches prevent damage to the belt and sheave system without disrupting the manner in which the control system operates the hydraulic circuit for control of the function of the CVT.

While one preferred embodiment of this invention is illustrated, it will be understood, of course that the invention is not limited to this embodiment. Those skilled in the art to which the invention pertains may make modifications and other embodiments employing the principles of the invention, particularly upon considering the foregoing teachings.

What is claimed is:

1. A continuously variable transmission system to provide transmission of torque from a torque input means to a torque output means, comprising:
    an input shaft disposed for operative connection to a torque input means, said torque input means being operable to transmit torque up to a first limiting value;
    a continuously variable drive system having a variable input pulley, a variable output pulley and a belt means interconnecting said input pulley and said output pulley, said belt means being operable to transmit torque up to a second limiting value, said second limiting value being greater than said first limiting value;
    a slippable start clutch means for selectively connecting said input shaft and said input pulley; and,
    a non-dynamic clutch system means for selectively connecting said output pulley with an output shaft, said output shaft being operatively connected to said torque output means, said non-dynamic clutch system means having a predetermined torque capacity, said predetermined torque capacity being between said first limiting value and said second limiting value.

2. The continuously variable transmission system of claim 1 wherein said non-dynamic clutch system means includes a first non-dynamic clutch and a second non-dynamic clutch 3. The continuously variable transmission system of claim 2 wherein engagement of said first non-dynamic clutch causes said output shaft to rotate in a first direction and engagement of said second non-dynamic clutch causes said output shaft to rotate in a second direction opposite said first direction.

4. A continuously variable transmission system to provide transmission of torque from a torque input means to a torque output means, comprising:
    an input shaft disposed for operative connection to a torque input means, said torque input means being operable to transmit torque up to a first limiting value;
    a continuously variable drive system having a variable input pulley disposed along said input shaft, a variable output pulley and a belt means interconnecting said input pulley and said output pulley, said belt means being operable to transmit torque up to a second limiting value, said second limiting value being greater than said first limiting value;
    a slippable start clutch means for selectively connecting said input shaft and said input pulley; and,
    a non-dynamic clutch system means for selectively connecting said output pulley with an output shaft, said output shaft being operatively connected to said torque output means, said non-dynamic clutch system means including first and second non-dynamic clutches, said first and second non-dynamic clutches having first and second predetermined torque capacities, said first and second predetermined torque capacities each being between said first limiting value and said second limiting value.

5. The continuously variable transmission system of claim 4 wherein engagement of said first non-dynamic clutch causes said output shaft to rotate in a first direction and engagement of said second non-dynamic clutch causes said output shaft to rotate in a second direction opposite said first direction.

6. The continuously variable transmission system of claim 5 wherein said first non-dynamic clutch is disposed on a first intermediate shaft, said first non-dynamic clutch including a first movable clutch plate and first means for coupling said first movable clutch plate to said first intermediate shaft, and said second non-dynamic clutch is disposed on a second intermediate shaft, said second non-dynamic clutch including a second movable clutch plate and second means for coupling said second movable clutch plate to said second intermediate shaft.

7. The continuously variable transmission system of claim 6 including a third means for coupling said first intermediate shaft to said output shaft and a fourth means for coupling said second intermediate shaft to said output shaft.

8. A continuously variable transmission system to provide transmission of torque from a torque input means to a torque output means, comprising:

an input shaft disposed for operative connection to a torque input means, said torque input means being operable to transmit torque up to a first limiting value;

a continuously variable drive system having a variable input pulley disposed along said input shaft, a variable output pulley and a belt means interconnecting said input pulley and said output pulley, said belt means being operable to transmit torque up to a second limiting value, said second limiting value being greater than said first limiting value;

a slippable start clutch means for selectively connecting said input shaft and said input pulley; and a non-dynamic clutch system means for selectively connecting said output pulley with an output shaft, said output shaft being operatively connected to said torque output means, said non-dynamic clutch system means including first and second non-dynamic clutches, said first non-dynamic clutch having a first movable clutch plate rotatably mounted on a first intermediate shaft and first means for coupling said first movable clutch plate to said first intermediate shaft to rotate said first intermediate shaft in a first direction, said second non-dynamic clutch having a second movable clutch plate rotatably mounted on a second intermediate shaft and second means for coupling said second movable clutch plate to said second intermediate shaft to rotate s id second intermediate shaft in a second direction opposite said first direction, third means for coupling said first intermediate shaft to said output shaft and a fourth means for coupling said second intermediate shaft to said output shaft, said third coupling means and said fourth coupling means being gear systems; and said first and second non-dynamic clutches having first and second predetermined torque capacities, said first and second predetermined torque capacities each being between said first limiting value and said second limiting value 9. The continuously variable transmission system of claim 8 wherein said third coupling means gear system includes a first gear member fixed for rotation with said first movable clutch plate and a second gear member intermeshed with said first gear member and fixed for rotation with said second intermediate shaft.

10. The continuously variable transmission system of claim 8 wherein said fourth coupling means gear system includes a first gear member fixed for rotation with said first intermediate shaft, an idler gear member intermeshed with said first gear member, and a second gear member intermeshed with said idler gear member and fixed for rotation with said second movable clutch plate.

* * * * *